United States Patent
Zhang et al.

(10) Patent No.: US 12,275,153 B2
(45) Date of Patent: Apr. 15, 2025

(54) CONTROL METHOD FOR DELIVERY ROBOTS, DELIVERY SYSTEM AND COMPUTER-READABLE STORAGE MEDIUM

(71) Applicant: Keenon Robotics Co., Ltd., Shanghai (CN)

(72) Inventors: Meihua Zhang, Shanghai (CN); Yuhao Liu, Shanghai (CN); Yayun Yang, Shanghai (CN)

(73) Assignee: Keenon Robotics Co., Ltd., Shanghai (CN)

(*) Notice: Subject to any disclaimer, the term of this patent is extended or adjusted under 35 U.S.C. 154(b) by 286 days.

(21) Appl. No.: 17/945,736

(22) Filed: Sep. 15, 2022

(65) Prior Publication Data

US 2023/0104367 A1   Apr. 6, 2023

(30) Foreign Application Priority Data

Sep. 26, 2021   (CN) .......................... 202111128023.7

(51) Int. Cl.
| | |
|---|---|
| *B25J 9/16* | (2006.01) |
| *B25J 11/00* | (2006.01) |
| *G05D 1/00* | (2024.01) |
| *G06Q 10/0631* | (2023.01) |
| *G06Q 10/083* | (2024.01) |
| *G06Q 10/0835* | (2023.01) |
| *G06Q 10/10* | (2023.01) |

(52) U.S. Cl.
CPC ........... *B25J 9/1666* (2013.01); *B25J 9/1653* (2013.01); *B25J 9/1682* (2013.01); *B25J 11/0005* (2013.01); *B25J 11/008* (2013.01)

(58) Field of Classification Search
None
See application file for complete search history.

(56) References Cited

U.S. PATENT DOCUMENTS

| | | | |
|---|---|---|---|
| 11,969,896 B2* | 4/2024 | Liu | G05D 1/0044 |
| 2022/0206511 A1* | 6/2022 | Chen | G05D 1/0223 |

OTHER PUBLICATIONS

Abrar et al. An Autonomous Delivery Robot to Prevent the Spread of Coronavirus in Product Delivery System, IEEE, p. 0461-0466 (Year: 2021).*

* cited by examiner

*Primary Examiner* — Thomas E Worden
*Assistant Examiner* — Atticus A Cameron
(74) *Attorney, Agent, or Firm* — Westbridge IP LLC

(57) ABSTRACT

Disclosed is a control method for delivery robots, wherein a distribution area has a preset home point. The control method includes: identifying a second delivery robot that obstructs a first delivery robot, wherein the first delivery robot is in a working state of heading to one or more target positions, and the second delivery robot is in an idle state; determining a distance between the second delivery robot and the home point; and controlling the second delivery robot to avoid the first delivery robot according to the distance between the second delivery robot and the home point. In view of the situation that an idle delivery robot may obstruct a delivery robot performing a task, the disclosure proposes an avoidance judgment logic to control the idle delivery robot to avoid, thereby improving distribution efficiency and preventing congestion.

16 Claims, 4 Drawing Sheets

CONTROL METHOD FOR DELIVERY ROBOTS, DELIVERY SYSTEM AND COMPUTER-READABLE STORAGE MEDIUM

CROSS-REFERENCE TO RELATED APPLICATIONS

The application claims priority to Chinese Patent Application CN202111128023.7, filed on Sep. 26, 2021, the entire contents of which are incorporated herein by reference.

TECHNICAL FIELD

The disclosure generally relates to the technical field of intelligent devices, and in particular, to a control method for delivery robots, a delivery system and a non-transitory computer-readable storage medium.

BACKGROUND

A delivery robot is an intelligent device used to transfer an item in a certain area, which can save labor costs and improve work efficiency. And the application of the delivery robot is more and more common in scenarios such as restaurants, hotels, hospitals, and exhibition halls. In application environments, it is usually necessary to arrange multiple delivery robots to meet the demand, but there is a problem of mutual influence when multiple robots move or stop in a distribution area. Especially, when some of the delivery robots perform tasks, some idle delivery robots with no task assigned may block moving paths of the delivery robots which are performing the tasks due to various reasons. In terms of this case, the existing control method is logically chaotic, and the avoidance rules of the control method are not clear, which seriously affects work efficiency of the delivery robot and may also cause local congestion and affect the normal passage of customers in scenarios where an activity area is relatively small, such as restaurants.

The contents in the background section are only technologies known to the inventors, and do not necessarily represent the prior art in the field.

SUMMARY

In view of one or more defects in the prior art, the disclosure provides a control method for a delivery robot. When an idle delivery robot without a task assigned blocks a moving path of a delivery robot which is performing a task, the idle delivery robot is controlled to perform avoiding according to the control method, which improves distribution efficiency and prevents congestion. At the same time, the disclosure also provides a delivery system and a non-transitory computer-readable storage medium, which are used to implement the control method.

In order to solve the above-mentioned technical problems, the disclosure adopts the following technical scheme.

The disclosure provides a control method for delivery robots, wherein a distribution area has a preset home point, and the control method includes:
identifying a second delivery robot that obstructs a first delivery robot, wherein the first delivery robot is in a working state of heading to one or multiple target positions, and the second delivery robot is in an idle state;
determining a distance between the second delivery robot and the home point; and
controlling the second delivery robot to avoid the first delivery robot according to the distance between the second delivery robot and the home point.

According to an aspect of the disclosure, the step of controlling the second delivery
robot to avoid the first delivery robot according to the distance between the second delivery robot and the home point includes:
controlling the second delivery robot to go to the home point to avoid when a distance between a stop position of the second delivery robot and the home point is less than or equal to a first preset distance.

According to an aspect of the disclosure, one or more avoidance areas are set in the distribution area, and the step of controlling the second delivery robot to avoid the first delivery robot according to the distance between the second delivery robot and the home point further includes:
controlling the second delivery robot to go to one of preset avoidance areas to perform avoiding, when the distance between the stop position of the second delivery robot and the home point is greater than the first preset distance.

According to an aspect of the disclosure, the control method for delivery robots further includes:
determining an avoidance area closest to the stop position of the second delivery robot; and
controlling the second delivery robot to go to the avoidance area closest to the stop position of the second delivery robot.

According to an aspect of the disclosure, the control method for delivery robots further includes:
controlling the second delivery robot to return to the stop position after the first delivery robot passes through the stop position.

According to an aspect of the disclosure, the first preset distance is 3 meters.

According to an aspect of the disclosure, the control method for delivery robots further includes: playing a preset voice and/or video on the second delivery robot in the process of controlling the second delivery robot to avoid the first delivery robot.

According to an aspect of the disclosure, the step of identifying a second delivery robot that obstructs the first delivery robot includes:
determining the second delivery robot on a path of the first delivery robot;
controlling the first delivery robot to report a location of the second delivery robot to a server so that the server determines a state of the second delivery robot.

According to an aspect of the disclosure, a delivery system includes:
a plurality of delivery robots;
a control system, configured to communicate with the delivery robots and perform the control method as previously described.

According to an aspect of the disclosure, the delivery robot includes an audio playback unit and a graphic display unit, both signally connected to the control system, and the control system is configured to control the audio playing unit to play an audio including information about the delivery robot performing avoiding and is configured to control the graphic display unit to display a graphic including the information about the delivery robot performing avoiding.

According to an aspect of the disclosure, a non-transitory computer-readable storage medium includes computer-executable instruction which implements the control method described above when executed by a processor.

Compared with the prior art, the embodiments of the disclosure provide the control method for delivery robots. In view of the situation where an idle delivery robot may obstruct a delivery robot which is performing a task, an avoidance judgment logic is proposed, and the idle delivery robot is controlled to perform avoiding, thereby improving distribution efficiency and preventing congestion. Meanwhile, the embodiments of the disclosure also provide the delivery system and the non-transitory computer-readable storage medium, which are used to implement the control method of the disclosure.

BRIEF DESCRIPTION OF THE DRAWINGS

The accompanying figures are used to provide a further understanding of the disclosure, constitute a part of the specification, and explain the disclosure together with the embodiments of the disclosure which do not constitute a limitation to the disclosure. In the accompanying figures.

DETAILED DESCRIPTION OF THE EMBODIMENTS

Figure 1:
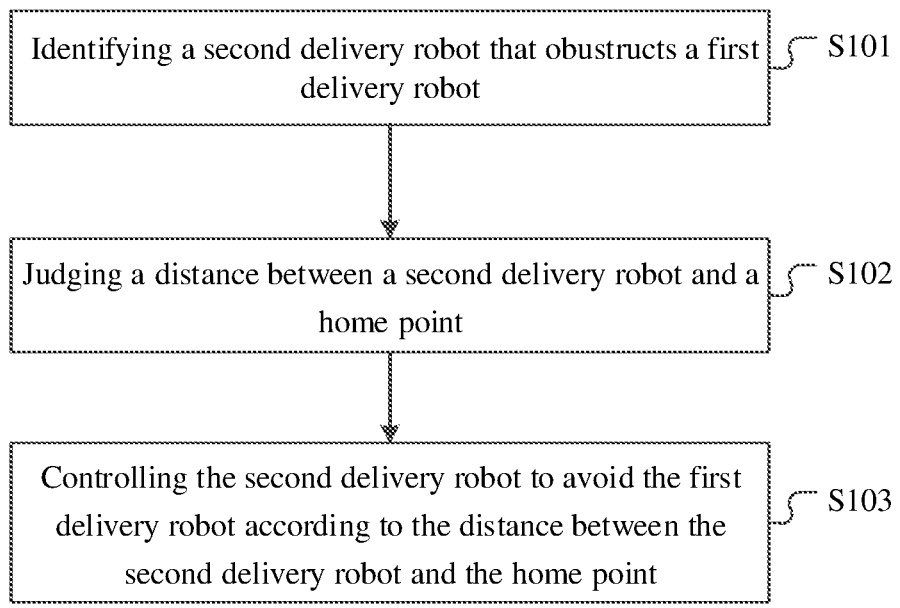
FIG. 1 is a schematic flowchart of an embodiment of the disclosure.

In the following contents, only certain exemplary embodiments are briefly described. As those skilled in the art would realize, the described embodiments may be modified in various different ways, all without departing from the spirit or scope of the disclosure. Accordingly, the drawings and description are to be regarded as illustrative in nature and not restrictive.

In the description of the disclosure, it should be understood that the terms "center", "longitudinal", "lateral", "length", "width", "thickness", "up", "down", "front", "back", "left", "right", "vertical", "horizontal", "top", "bottom", "inner", "outer", "clockwise", "counterclockwise", and the orientation or positional relationship indicated by etc. is based on the orientation or positional relationship shown in the accompanying drawings. The terms are only for the convenience of describing the disclosure and simplifying the description, rather than indicating or implying that the referred device or element must have a specific orientation, be constructed and operated in a specific orientation, therefore, these terms should not be construed as a limitation of the disclosure. Furthermore, the terms "first" and "second" are only used for descriptive purposes and should not be understood as indicating or implying relative importance or implying the number of indicated technical features. Thus, features defined as "first", "second" may expressly or implicitly include one or more of said features. In the description of the disclosure, "plurality" means two or more, unless otherwise expressly and specifically defined.

In the description of the disclosure, it should be noted that, unless otherwise expressly specified and limited, the terms "install", "link" and "connect" should be understood in a broad sense. For example, it may be a fixed connection or a detachable connection, or integral connection; it may be a mechanical connection, an electrical connection or may communicate with each other; it may be directly connected or indirectly connected through an intermediate medium; it can be an internal communication of two elements or an interaction of two elements. For those skilled in the art, the specific meanings of the above terms in the disclosure may be understood according to specific situations.

In the disclosure, unless otherwise expressly specified and limited, a first feature "on" or "under" a second feature may include direct contact between the first and second features or may include that the first feature contacts the second features not directly but through additional features between them. Also, the first feature being "above", "over" and "on" the second feature includes that the first feature is directly above and obliquely above the second feature, or simply means that the first feature is vertically higher than the second feature. The first feature being "below", "beneath" and "under" the second feature includes that the second feature being directly above and obliquely above the first feature, or simply means that the first feature is vertically lower than the second feature.

The following disclosure provides many different embodiments or examples for implementing different structures of the disclosure. In order to simplify the disclosure of the disclosure, components and arrangements of specific examples are described below. Of course, they are only examples and are not intended to limit the application. Furthermore, the present disclosure may repeat reference numerals and/or reference letters in different examples, to make the description simple and clear, which does not in itself indicate a relationship between the various embodiments and/or arrangements discussed. In addition, the present disclosure provides examples of various specific processes and materials, but one of the skilled in the art may realize an application of other processes and/or the use of other materials.

Preferred embodiments of the disclosure will be described below with reference to the accompanying drawings. It should be understood that the preferred embodiments described herein are only used to illustrate and explain the disclosure, but not to limit the disclosure.

Figure 6:
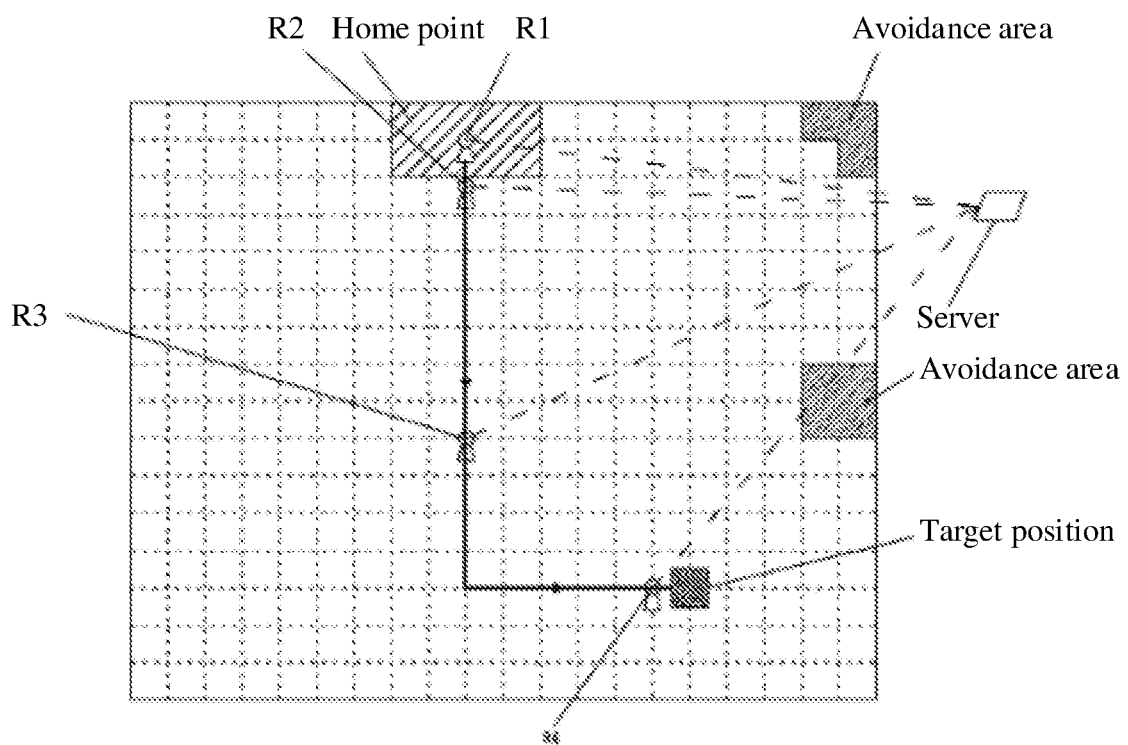
FIG. 6 is a schematic diagram of an application scenario in an embodiment of the disclosure.

FIG. 1 shows a control method 100 for delivery robots according to an embodiment of the disclosure. FIG. 6 shows an application scenario according to an embodiment of the disclosure, which will be described in detail below with reference to FIG. 1 and FIG. 6.

As shown in FIG. 6, a distribution site (such as restaurants, warehouses, shopping malls, etc.) can be pre-segmented according to site conditions and user requirements, and a position of a home point can be set according to the application scenarios after segmentation. Further, a distribution area can also be divided by criss-crossing grids, and a corresponding coordinate system can be established, which is convenient for confirming and describing the position of the delivery robot and target positions in the delivery task, and also helps to plan an moving path of the delivery task. In addition, one or multiple avoidance areas are also set in the distribution site. FIG. 6 schematically shown an avoidance area being located at the corner or edge of the field, but the disclosure is not limited thereto, and the avoidance area may also be set at other positions, such as the edge of a wide passage. In the delivery system of FIG. 6, a plurality of delivery robots are provided, such as the delivery robots R1, R2, R3 and R4 shown in the figure, and a server is provided. The server may communicate with the delivery robots and execute all or part of control functions of the delivery robots.

As shown in FIG. 1 and FIG. 6, the control method 100 of the delivery robots includes the following steps.

In step S101, a second delivery robot R2 that obstructs a first delivery robot R1 is identified. Therein the first delivery robot R1 is in a working state and is heading to one or multiple target positions. The working state means that the first delivery robot R1 is performing a delivery task, for example, carrying items to be delivered and heading to the target position of the delivery task. The second delivery robot R2 is in an idle state. The idle state here does not mean a be off state with no specific tasks at all. It only means that the second delivery robot R2 is not performing the task of delivering items at this time, but may be performing other tasks, for example, publicity displaying, background music displaying, air purification etc., during which the second delivery robot R2 is in a fixed position or active in a fixed area. In this step, the second delivery robot R2 may obstruct the first delivery robot R1, which means that the stop position or active area of the second delivery robot R2 is on a delivering path of the first delivery robot R1, and the second delivery robot R2 prevents the first delivery robot R1 from passing through.

In step S102, a distance between the second delivery robot R2 and the home point is determined. The distribution area may be divided as shown in FIG. 6, and the coordinates may be set. In this step, the home point is a preset position or area in the distribution area, which can be set according to specific requirements and a working environment of the application scenario. The first delivery robot R1 departs from the home point and goes to the target position. The home point may be a position where the delivery robot carry the goods to be delivered. For example, when the delivery robot undertakes a task of delivering meals in a restaurant, a food outlet may be set as the home point, and if there is insufficient space near the food outlet, the home point may be set in other locations as needed. Another example is a hotel that provides delivery services for customers. Customers can order goods from convenience store of the hotel, and the delivery robot will deliver them to the room. In this application environment, the home point may be set in the convenience store or a unified distribution location from where the delivery robot goes to a target position to perform the delivery task after being loaded with the goods by operators. The home point may also be set at other positions, such as a charging position of the delivery robot, a uniformly set stop position, or a window area specially used for display, etc.

In step S103, the second delivery robot R2 is controlled to avoid the first delivery robot R1 according to the distance between the second delivery robot R2 and the home point. In this embodiment, the second delivery robot R2 that does not perform the delivery task is controlled to avoid the first delivery robot R1 that is performing the delivery task, while the first delivery robot R1 runs normally and goes to the target position of the delivery task without additional operation or turning to stop, etc., which prevents chaotic movement of multiple delivery robots and simplifies avoidance process. In addition, due to different types of items to be delivered, the quality of the items to be delivered may also be guaranteed and situations such as damage, loss or spillage may be prevented by avoiding frequent changes of directions of the delivery robot.

Figure 2:
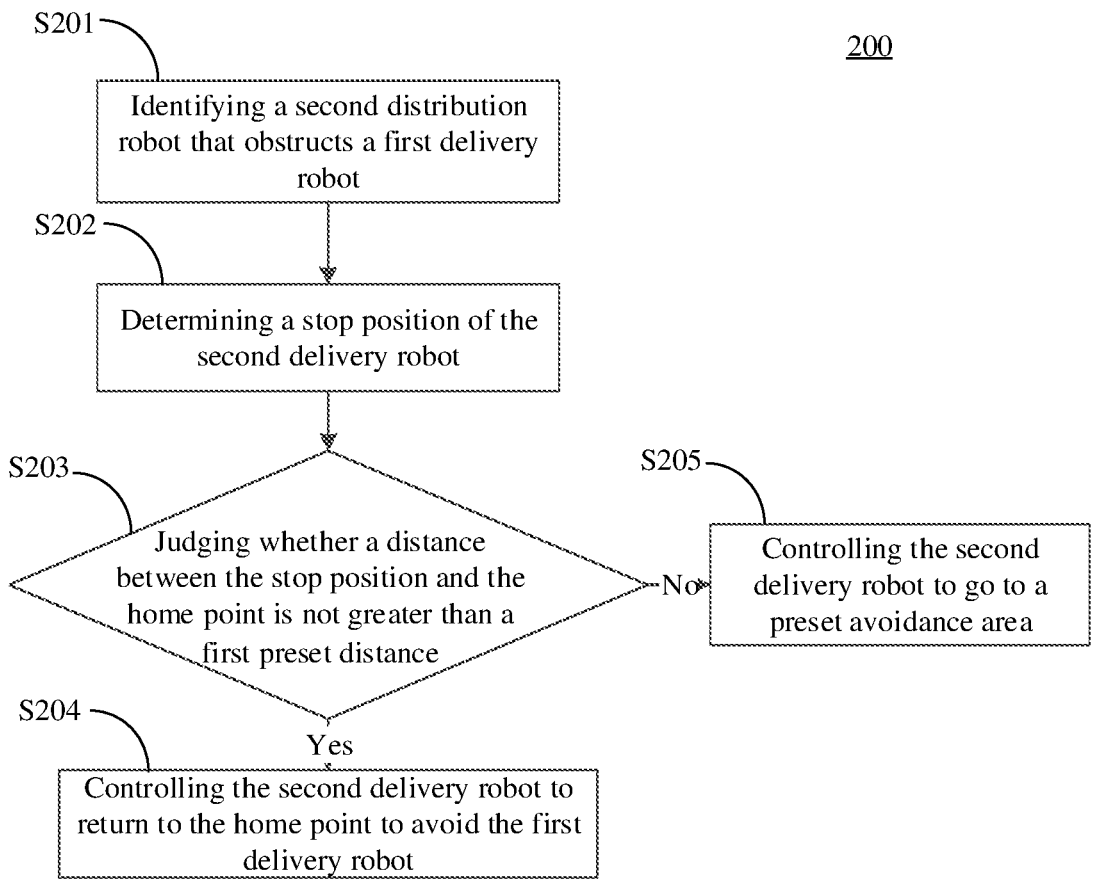
FIG. 2 is a schematic flowchart including judging a distance between the second delivery robot and a home point in an embodiment of the disclosure.

According to an embodiment of the disclosure, FIG. 2 shows a control method 200 according to an embodiment of the disclosure, which includes a specific judging method based on the distance between the second delivery robot and the home point. A control method 200 for delivery robots is described in detail with reference to FIG. 2 as followed.

As shown in FIG. 2, the control method 200 for the delivery robots includes the following steps.

In step S201, a second delivery robot that obstructs a first delivery robot R1 is identified. In this step, the identification process may be performed by the first delivery robot R1 and/or by the second delivery robot to identify. In this case, the first delivery robot R1 or the second delivery robot may have a detection device, such as a camera or a laser radar, and when it is confirmed that there is another delivery robot through the detection device, the two delivery robots establish communication to determine their respective task state. For example, the first delivery robot R1 goes to the target position to perform the delivery task, obtains a location information of the second delivery robot through the detection device, and determines through mutual communication that the second delivery robot is not performing the delivery task. And then the first delivery robot or the second delivery robot may recognize whether there is a obstructing situation or a obstructing possibility. In another situation, the detection device of the second delivery robot detects the first delivery robot R1 that is performing the delivery task, establishes a communication between them, and obtains the path of the first delivery robot R1 to perform the delivery task to identify whether it is located in the path of the first delivery robot R1 performing the delivery task and obstructs the first delivery robot R1. In another identifying process, the first delivery robot R1 performing the delivery task may also send its own path information to other delivery robots in all distribution areas, and the other delivery robots can identify and judge whether they obstruct the first delivery robot R1. The identification process may also be completed by a control system in the background, and the relevant information of the first delivery robot R1 and the second delivery robot is uniformly processed and controlled by the delivery system, which will be described in detail in other embodiments below.

In step S202, a stop position of the second delivery robot R2 is determined. In this step, the stop position is a position of the second delivery robot R2 before performing avoiding, which may be a specific position of stopping, or may also be a position of the activity area set in other tasks. In the process of determining the stop position, the stop position may be recorded or uploaded to the control system in the background by the second delivery robot R2 itself, and may also be recorded or uploaded to the control system in the background by the first delivery robot R1 after the first delivery robot R1 detects the second delivery robot R2. The control system in the background may also monitor and record the position of each delivery robot in the distribution area in real time.

In step S203, it is judged whether the distance between the stop position and the home point is not greater than a first preset distance. The first preset distance is a preset value, and a reasonable distance which is set according to the space around the home point, the actual situation and requirement of the distribution scenario, the number of the delivery robots in the distribution area and other specific conditions and needs. For example, it may be set as 3 meters.

In step S204, the second delivery robot R2 is controlled to return to the home point to avoid the first delivery robot when the distance between the stop position and the home point is not greater than the first preset distance, as shown in FIG. 6. In this step, the second delivery robot R2 that does not perform the delivery task is relatively close to the home point and the distance is not greater than the first preset distance. In this case, it is considered that the second delivery robot R2 is not performing other tasks and stopping near the home point may be caused by human collision or displacement. At this time, the second delivery robot R2 is controlled to return to the home point and wait for other tasks to be assigned. Moreover, a delivery robot with a stop position near the home point will repeatedly obstruct the delivery robot departing from the home point, which will seriously affect the performing of delivery tasks. Therefore, in this embodiment, it is proposed that the second delivery robot R2 is controlled to return to the home point and stop at the home point.

In step S205, the second delivery robot R3 is controlled to go to a preset avoidance area when the distance between the stop position and the home point is greater than the first preset distance (for example, when R3 is the second delivery robot), as shown in FIG. 6. The avoidance area is one or multiple areas set in the distribution area. The avoidance area is not set on the possible path of the delivery task, and is used for the delivery robot that is not performing the delivery task temporarily to stop and avoid the delivery robot that is performing the delivery task. The avoidance area is also preset according to actual environment, and it may be an edge position with less flow of people, such as a position close to a corner of a wall. In the step S205, the process of controlling the second delivery robot R3 to go to the preset avoidance area may also conclude: controlling the second delivery robot, when not performing the delivery task, to plan a moving path from the current position of the second delivery robot to the avoidance area using its own or background control system. When a blockage occurs and the situation that controls the second delivery robot to go to the avoidance area for avoidance is met, the second delivery robot is controlled to follow the moving path pre-planned to the avoidance area to perform avoiding, thereby reducing waiting time. In this case, the distance between the second delivery robot R3 and the home point is far, and returning to the home point may cause congestion near the home point. The avoidance area is set up in the distribution area for the second delivery robot R3 to temporarily stop in order to make full use of the corner positions in the distribution area, which reduces disturbance to other people who are active in the area and avoid confusion. Further, according to an embodiment of the disclosure, as shown in FIG. 6, in this step, if multiple avoidance areas are set in the distribution area, the avoidance area closest to the stop position of the second delivery robot R3 may also be selected, and the second delivery robot R3 is controlled to go to the closest avoidance area, thereby shortening the avoidance distance, reducing the total number of delivery robots moving at the same time, and reducing energy consumption.

Figure 3:
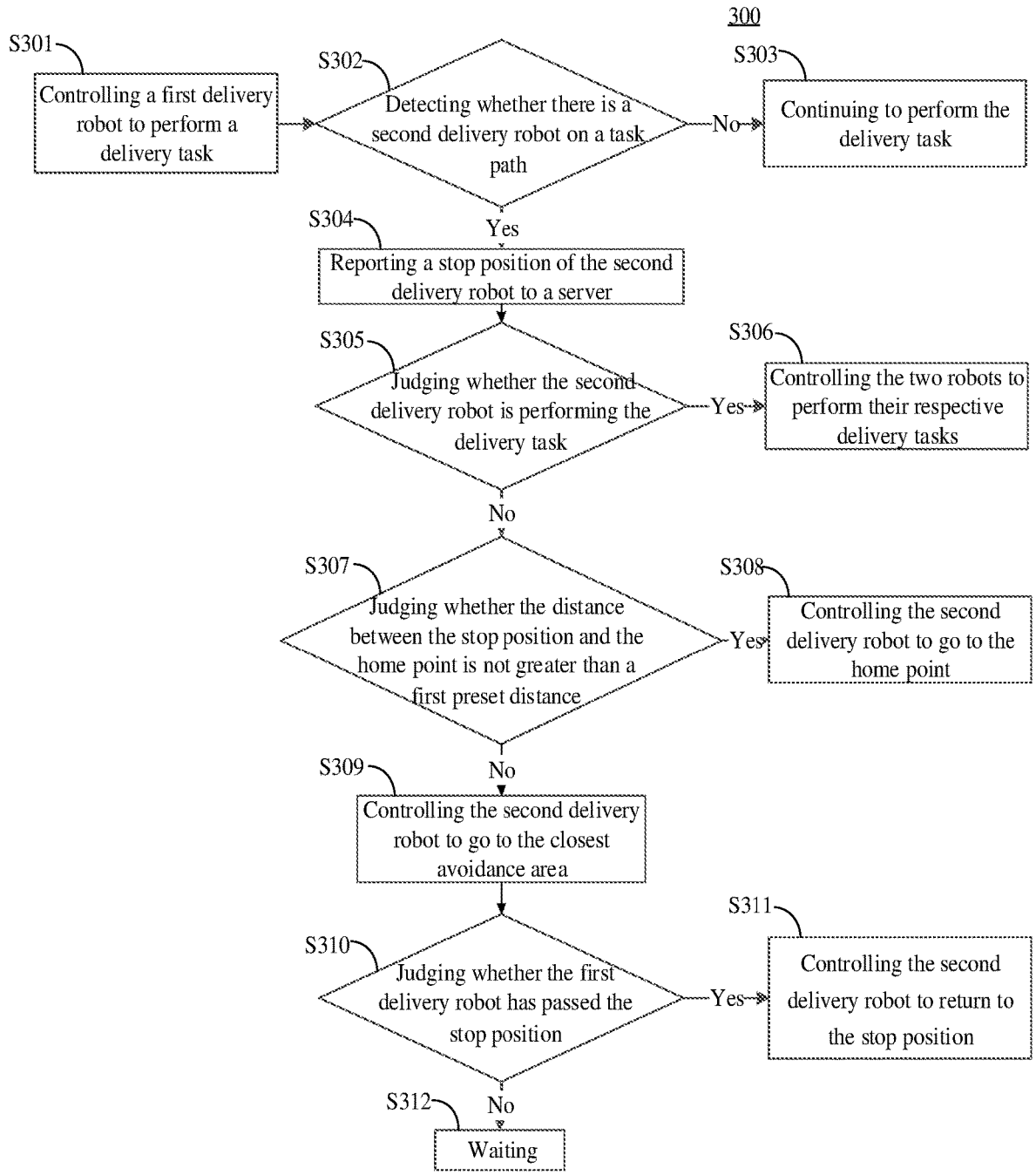
FIG. 3 is a detailed schematic flowchart of an embodiment of the disclosure.

According to an embodiment of the disclosure, FIG. 3 shows a detailed flow of a control method for delivery robots, including the process of identifying a delivery robot that does not have a delivery task and obstructs a delivery robot which is performing a delivery task, which will be described in detail below with reference to FIG. 3.

As shown in FIG. 3, in step S301, the first delivery robot R1 is controlled to perform a delivery task, that is, the delivery robot that performs the delivery task is set as the first delivery robot R1. The delivery task includes a target position. An internal control system or an unified control system in the background of the first delivery robot R1 determines a moving path of the first delivery robot R1 through the position information of the target position and the home point position. The first delivery robot R1 is controlled to go to the target position along the set moving path to perform the delivery task.

In step S302, whether there is a second delivery robot on the moving path is detected. In this embodiment, this step may be performed by the first delivery robot R1. For example, the first delivery robot R1 may detect an obstacle on the moving path ahead of it through a device such as a camera or a laser radar set on the first delivery robot R1. In order to prevent collisions and other situations, the first delivery robot R1 can be set to detect the surrounding environment in real time through devices such as cameras or laser radar when moving, and can report the location of the obstacle to the server after discovering the obstacle, and use the server to determine the type of the obstacle. For example, as shown in FIG. 6, in the distribution area where the coordinate system is established, the server can be set to monitor the positions of all delivery robots in real time. When the first delivery robot R1 reports the obstacle to the server, the server compares the coordinate of the obstacle with the coordinate of the delivery robot to confirm whether the obstacle ahead is the delivery robot.

If no delivery robot is detected, in step S303, the first delivery robot R1 is controlled to continue to perform the delivery task. The detection process lasts for the entire execution time of the delivery task.

If in the step S302, the second delivery robot is detected on the task path ahead, in step S304, as shown in FIG. 6, the delivery robot communicates with the server and reports the stop position of the second delivery robot to the server. In this embodiment, this step can be performed by the first delivery robot R1 or by the second delivery robot R1 through communicating with the first delivery robot R1. And the server can monitor the real-time locations of all delivery robots in the distribution area, and whether a blockage occurs is determined through the server or the first delivery robot R1, that is, there is a second delivery robot on the moving path. FIG. 3 is only a schematic diagram, and it is not limited to perform step S304 after the judgment in the step S302, and there is no necessary sequence relationship between the two steps. According to the embodiment of the disclosure, the delivery robot can also be set to report its current position to the server in real time, including the stop position of the second delivery robot, that is, step S304 runs through the entire time of performing the delivery task. When the delivery robot's stop position information is needed to be obtained, relevant information can be directly extracted. Further, the reported stop position of the second delivery robot can be used for verification to obtain more accurate information. In this step, the second delivery robot does not specifically refer to a delivery robot that does not perform delivery tasks, but is only used to represent other delivery robots other than the first delivery robot. In this step, the stop position refers to the location or activity area where the second delivery robot is located at the current time. For example, in a restaurant scene, the second delivery robot is moving back and forth in a certain area to perform the task of introducing dishes to customers. In this case, the stop position may be the position where the second delivery robot is located at this time, or may refer to the range of this area.

After the server obtains the stop position of the second delivery robot, in step S305, the task state of the second delivery robot may be determined by the server. In this embodiment, it is judged whether the second delivery robot is performing the delivery task, which may be confirmed by the background through assignment of task recorded in the control system and may also be confirmed by the second delivery robot through reporting its own task state to the server. If the second delivery robot is also performing the delivery task, it is considered that the priorities of the first delivery robot R1 and the second delivery robot are the same, and there is no difference in priority. In step S306, the first delivery robot R1 and the second delivery robot are controlled to perform their respective delivery tasks. At this time, none of the delivery robots between the two is controlled to perform avoiding, and under the premise of avoiding collisions, each robot performs its delivery task.

In the step S305, if the judgment result is that the second delivery robot is not performing the delivery task but waiting to stop or performing other tasks like publicity broadcasting, fixed-point tour, and in-situ waiting, etc., the second delivery robot needs to be controlled to avoid the first delivery robot R1 which is performing the delivery task, so as to ensure that the first delivery robot R1 has priority to pass. In step S307, it is judged whether the distance between the stop position of the second delivery robot and the home point is not greater than a first preset distance, wherein the first preset distance is set according to specific conditions, for example, it may be 3 meters. When the distance between the stop position of the second delivery robot and the home point is not greater than the first preset distance, the second delivery robot is set as R2. And in step S308, the second delivery robot R2 is controlled to go to the home point to avoid the first delivery robot R1 and return to the home point, waiting for subsequent tasks. If the distance between the stop position of the second delivery robot and the home point is greater than the first preset distance, the second delivery robot is set as R3. And in step S309, the second delivery robot R3 is controlled to go to the avoidance area to avoid the first delivery robot R1. And the steps S308 and S309 may be controlled uniformly by the server, or the control part may be integrated on the second delivery robot with the server only providing a judgment result. Further, the avoidance area closest to the stop position may be selected for avoidance, which reduces a moving distance to reduce an impact on the task of the second delivery robot R3 itself.

In the step S309, the second delivery robot R3 is controlled to go to the closest avoidance area. This step is a continuous process, including controlling the second delivery robot R3 to perform avoiding and keep waiting after it has reached the avoidance area. In step S310, it is judged whether the first delivery robot R1 has passed the stop position of the second delivery robot R3. This step may be realized by the first delivery robot R1 through reporting its own position, or by the server through monitoring the position of the first delivery robot R1 in real time. If the first delivery robot R1 has passed the stop position of the second delivery robot R3 in step S311, the second delivery robot R3 is controlled to return to the previous stop position, so that the second delivery robot R3 can continue to perform the original task. If the stop position is as described above, specifically referring to an area of a certain range, the second delivery robot R3 is controlled to return to the area and continue to perform the original task, such as moving back and forth in this range. If the first delivery robot R1 has not passed the stop position of the second delivery robot R3, in step S312, the second delivery robot R3 is controlled to continue to go to the avoidance area or keep waiting in the avoidance area until the first delivery robot R1 passes the stop position of the second delivery robot R3. And then the step S311 is executed.

Figure 4:
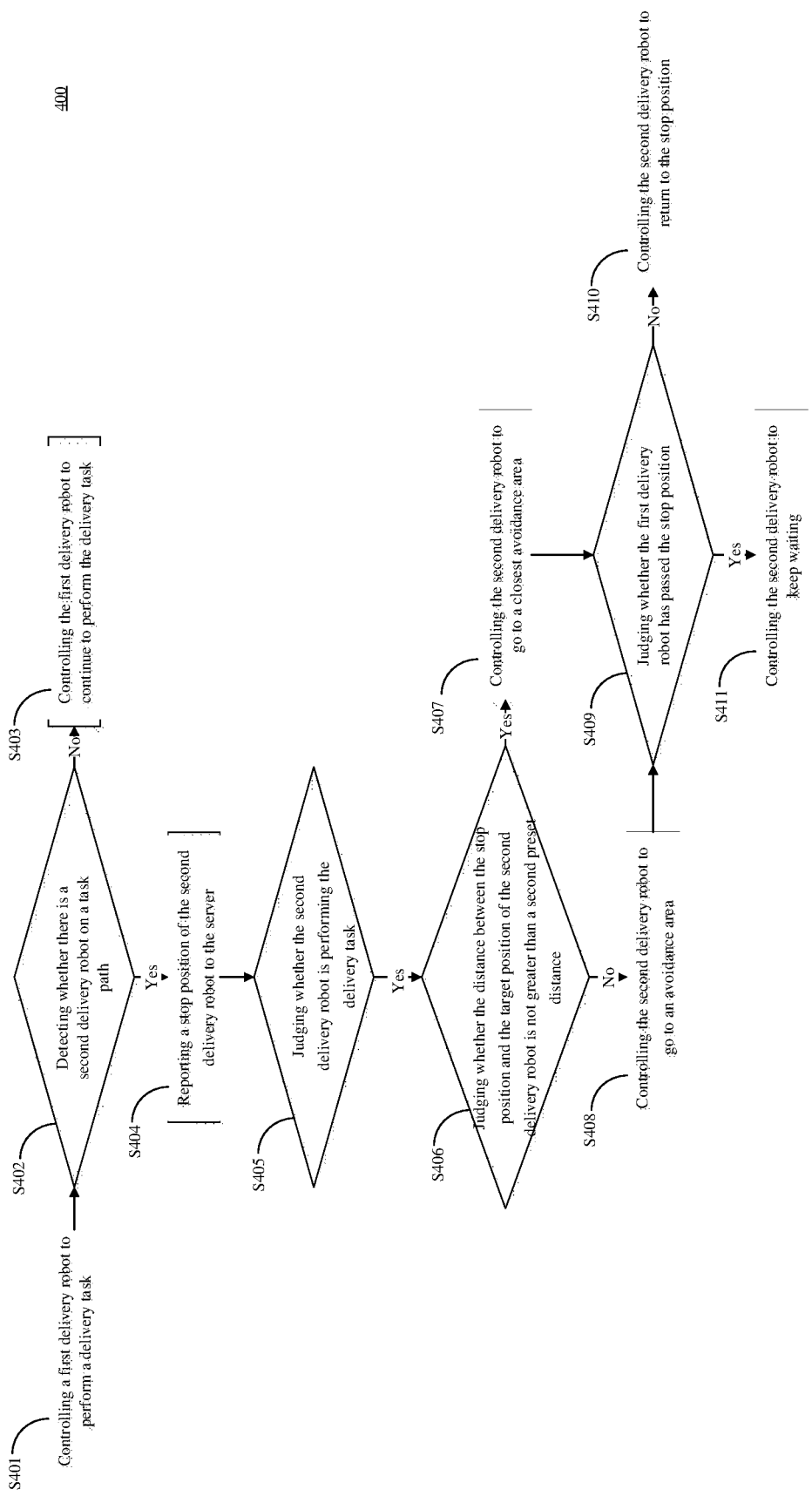
FIG. 4 is a schematic flowchart including judging a distance between the second delivery robot and a target position in an embodiment of the disclosure.

According to an embodiment of the disclosure, FIG. 4 shows a control method 400 for delivery robots. This embodiment is a special situation where it is judged that a second delivery robot which obstructs the first delivery robot is also performing a delivery task in the process of controlling the delivery robot to perform a delivery task. The embodiment is described in detail with reference to FIG. 4.

Normally, the delivery robots maintain a same speed of movement. If the second delivery robot is performing the delivery task, it will not obstruct the first delivery robot R1. However, after the second delivery robot completes the delivery task, the task state of the delivery robot may not be updated in time, resulting in that it may be still judged that the second delivery robot is performing the delivery task, which affects the subsequent dispatching arrangement of the delivery robot. Therefore, a control method 400 as shown in FIG. 4 is provided. Steps S401, S402, S403, S404 and S405 in FIG. 4 are respectively the same as the steps S301, S302, S303, S304 and S305 in FIG. 3 and will not be repeated here.

As shown in FIG. 4, according to an embodiment of the disclosure, in step S405, it is judged whether the second delivery robot is performing a delivery task. If the second delivery robot is not performing the delivery task, the subsequent steps are the same as the control method 300; if the second delivery robot is performing the delivery task, in step S406, the distance between the stop position of the second delivery robot and the target position of the delivery task performed by the second delivery robot is determined. If the distance between the stop position of the second delivery robot and the target position of its delivery task is not greater than the second preset distance, that is, the second delivery robot stops near its target position, it is considered that the second delivery robot may have other tasks at the target position or has not completed the delivery task. Then in step S407, the second delivery robot is controlled to go to the nearest avoidance area, so as to ensure that the second delivery robot can return as soon as possible and continue to perform the task.

If the distance between the stop position of the second delivery robot and the target position of its delivery task is greater than the second preset distance, due to the second delivery robot being far away from the target position of its delivery task, it is considered that the second delivery robot has completed the delivery task and may be performing other tasks. In this embodiment, the task of the second delivery robot may be interrupted to ensure that the first delivery robot R1 passes through preferentially. Therefore, the distance limitation is not considered. In step S408, the second delivery robot is controlled to go to the avoidance area.

In step S409, it is judged whether the first delivery robot R1 has passed the stop position of the second delivery robot. If the first delivery robot R1 has passed the stop position, in step S410, the second delivery robot is controlled to return to the original stop position; if the first delivery robot R1 has not passed the stop position, in step S411, the second delivery robot is controlled to wait in the avoidance area, or continue to go to the avoidance area.

According to an embodiment of the disclosure, the delivery robot in this embodiment further has an audio playback device and/or a graphic display device, such as a speaker and a display screen. When the second delivery robot is controlled to avoid the first delivery robot R1, the audio playback device is controlled to play corresponding audio, and the graphic display device is controlled to display corresponding graphics or videos.

Specifically, in the embodiments mentioned before, when the second delivery robot is controlled to avoid the first delivery robot R1, the audio playback device may play a preset audio. Different preset audio may be selected according to different destinations for avoiding. The preset audio includes information about the second delivery robot being performing avoiding, and also includes information about the destination where the second delivery robot is about to go, such as "is avoiding the delivery robot No.XX and is about to go to the food outlet" or "is going to the No. 1 area to avoid". When the second delivery robot is controlled to return to the original stop position and perform the original task, a preset audio including information about returning to an original position and performing a certain task may be played. When the second delivery robot is controlled to return to the home point for avoidance, a preset audio including information about being in the idle state may also be played. In this embodiment, the graphic displayed by the graphic display device of the delivery robot is also adjusted according to different destinations the second delivery robot is heading to. Further, the graphic display device may also display a complete distribution area, and a moving path that the second delivery robot would use when the second delivery robot is heading to the destination and performing avoiding.

Figure 5:
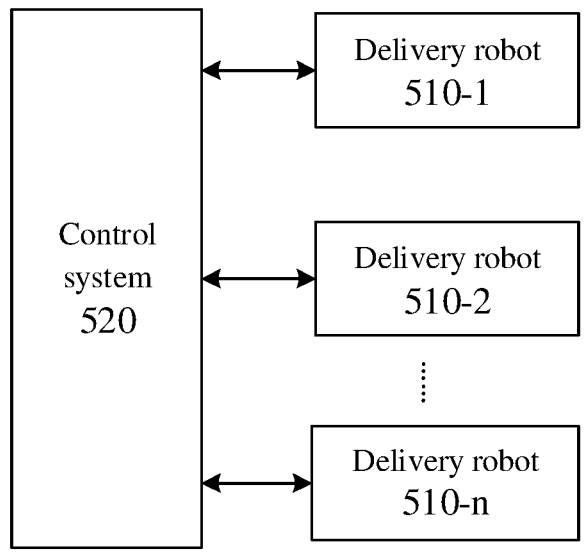
FIG. 5 is a schematic diagram of a delivery system in an embodiment of the disclosure.

According to an embodiment of the disclosure, FIG. 5 shows a delivery system 500. The delivery system 500 includes a plurality of delivery robots 510 and a control system 520, wherein the control system 520 communicates with the delivery robots 510 and may implement the control method 100, 200, 300 or 400 as described above. The multiple delivery robots 510 communicate with the control system 520 and may upload information to the control system, wherein the information includes a current location of the delivery robot 510 and a current status of its task including whether the delivery robot 510 is performing the delivery task. The plurality of delivery robots 510 may also receive information sent by the control system 520, and the control system 520 may control the delivery robot that is not performing the delivery task to avoid the delivery robot that is performing the delivery task, including controlling the delivery robot to go to the home point or the avoidance area. And the control system may also feed back information that the first delivery robot has passed the stop position and control the second delivery robot to return to the former stop position after its avoidance action. The control system may also be used to judge whether a blockage occurs and identify a task in which the blockage may occur, through location information, status of the tasks and moving paths of the tasks uploaded by the delivery robot.

In the delivery system 500, the delivery robot may also have a signal identification element for identifying obstacles blocking ahead, and can confirm the type of the obstacles through a preset method to determine whether there are other delivery robots. For example, the type of the obstacles may be identified through setting identification code on the delivery robot or analyzing an image acquired by camera.

According to an embodiment of the disclosure, there is also provided a non-transitory computer-readable storage medium comprising computer-executable commands stored thereon, wherein the control method for delivery robots previously described is implemented when the processor performs the executable commands.

The technical solution of the disclosure makes the robot avoidance more intelligent and reliable. In the prior art, a robot which is performing a task needs to perform avoiding when it encounters a robot with no task, which prolongs distribution time and thus affects distribution efficiency. In the disclosure, when a delivery robot which is performing a task encounters a delivery robot with no task, the delivery robot with no task is controlled to perform avoiding, and the delivery robot which is performing a task will continue delivery following the original planned route without the need for the avoidance action, making the distribution more efficient.

Finally, it should be noted that the above are only preferred embodiments of the disclosure, and are not intended to limit the disclosure. Although the disclosure has been described in detail with reference to the foregoing embodiments, for those skilled in the art, it is still the technical solutions described in the foregoing embodiments may be modified, or some technical features thereof may be equivalently replaced. Any modification, equivalent replacement, improvement, etc. made within the spirit and principle of the disclosure shall be included within the protection scope of the disclosure.

What is claimed is:

1. A control method for delivery robots, wherein the control method comprises:
   identifying a second delivery robot that obstructs a first delivery robot in a distribution area, wherein the distribution area has a preset home point, and the first delivery robot is in a working state of heading to one or multiple target position, and the second delivery robot is in an idle state;
   determining a distance between the second delivery robot and the home point;
   controlling the second delivery robot to avoid the first delivery robot according to the distance between the second delivery robot and the home point; and
   controlling the second delivery robot to play a preset voice and/or video in the process of controlling the second delivery robot to avoid the first delivery robot.

2. The control method according to claim 1, wherein the step of controlling the second delivery robot to avoid the first delivery robot according to the distance between the second delivery robot and the home point comprises:
   controlling the second delivery robot to go to the home point to avoid when a distance between a stop position of the second delivery robot and the home point is less than or equal to a first preset distance.

3. The control method according to claim 2, wherein at least one avoidance area is set in the distribution area, and the step of controlling the second delivery robot to avoid the first delivery robot according to the distance between the second delivery robot and the home point further comprises:
   controlling the second delivery robot to go to one of the at least one avoidance area to avoid the first delivery robot when the distance between the stop position of the second delivery robot and the home point is greater than the first preset distance.

4. The control method according to claim 3, wherein the step of controlling the second delivery robot to go to one of the at least one avoidance area to avoid the first delivery robot comprises:
   determining an avoidance area closest to the stop position of the second delivery robot; and
   controlling the second delivery robot to go to the avoidance area closest to the stop position of the second delivery robot.

5. The control method according to claim 4, further comprising:
controlling the second delivery robot to return to the stop position after the first delivery robot passes through the stop position.

6. The control method according to claim 2, wherein the first preset distance is 3 meters.

7. The control method according to claim 1, wherein the step of identifying the second delivery robot that obstructs the first delivery robot comprises:
determining the second delivery robot on a path of the first delivery robot; and
controlling the first delivery robot to report, a location of the second delivery robot to a server, so that the server determines a state of the second delivery robot.

8. A delivery system, comprising:
a plurality of delivery robots;
a control system, configured to communicate with the delivery robots and perform a control method for delivery robots, wherein the control method for delivery robots comprises:
identifying a second delivery robot that obstructs a first delivery robot in a distribution area, wherein the distribution area has a preset home point, and the first delivery robot is in a working state of heading to one or multiple target position, and the second delivery robot is in an idle state;
determining a distance between the second delivery robot and the home point; and
controlling the second delivery robot to avoid the first delivery robot according to the distance between the second delivery robot and the home point; wherein the delivery robot comprises an audio playback unit and a graphic display unit, both signally connected to the control system, and the control system is configured to control the audio playback unit to play an audio containing information about that the delivery robot performs avoiding and is configured to control the graphic display unit to display a graphic containing the information about that the delivery robot performs avoiding.

9. The delivery system according to claim 8, wherein the controlling the second delivery robot to avoid the first delivery robot according to the distance between the second delivery robot and the home point comprises:
controlling the second delivery robot to go to the home point to avoid when a distance between a stop position of the second delivery robot and the home point is less than or equal to a first preset distance.

10. The delivery system according to claim 9, wherein at least one avoidance area is set in the distribution area, and the controlling the second delivery robot to avoid the first delivery robot according to the distance between the second delivery robot and the home point further comprises:
controlling the second delivery robot to go to one of the at least one avoidance area to avoid the first delivery robot when the distance between the stop position of the second delivery robot and the home point is greater than the first preset distance.

11. The delivery system according to claim 10, wherein the controlling the second delivery robot to go to one of the at least one avoidance area to avoid the first delivery robot comprises:
determining an avoidance area closest to the stop position of the second delivery robot; and
controlling the second delivery robot to go to the avoidance area closest to the stop position of the second delivery robot.

12. The delivery system according to claim 11, wherein the control method for delivery robots further comprises:
controlling the second delivery robot to return to the stop position after the first delivery robot passes through the stop position.

13. The delivery system according to claim 9, wherein the first preset distance is 3 meters.

14. The delivery system according to claim 8, wherein the control method for delivery robots further comprises:
controlling the second delivery robot to play a preset voice and/or video in the process of controlling the second delivery robot to avoid the first delivery robot.

15. The delivery system according to claim 8, wherein the identifying the second delivery robot that obstructs the first delivery robot comprises:
determining the second delivery robot on a path of the first delivery robot; and
controlling the first delivery robot to report, a location of the second delivery robot to a server, so that the server determines a state of the second delivery robot.

16. A non-transitory computer-readable storage medium comprising computer-executable instructions stored thereon which, when executed by a processor, implement the control method according to claim 1.

* * * * *